July 9, 1946.  W. B. O'NEAL  2,403,749
FUEL TANK VENT
Filed May 17, 1943   2 Sheets-Sheet 2

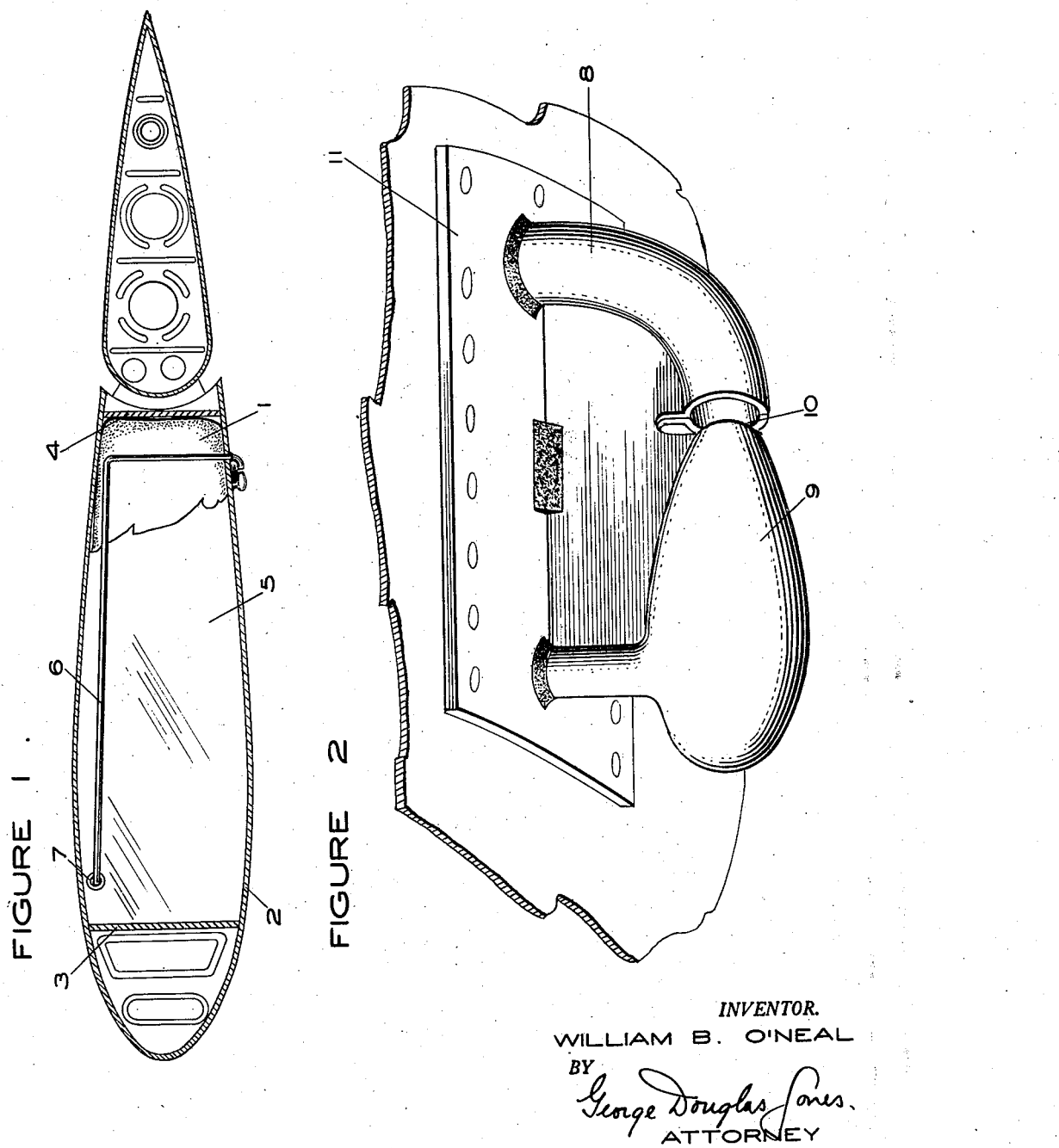

INVENTOR
WILLIAM B. O'NEAL
BY George Douglas Jones
ATTORNEY

Patented July 9, 1946

2,403,749

UNITED STATES PATENT OFFICE 2,403,749

FUEL TANK VENT

William B. O'Neal, Ellicott City, Md., assignor to The Glenn L. Martin Company, Middle River, Md., a corporation of Maryland Application May 17, 1943, Serial No. 487,255

2 Claims. (Cl. 244—135)

This invention relates to a vent for fuel storage tanks on any vehicle, but is particularly adapted for venting the fuel storage tanks on aircraft.

It has always been a problem to provide proper vents for the fuel tanks of aircraft. These vents serve several useful purposes, fundamentally, they let air into the tanks as the fuel is withdrawn by the fuel pumps of the engine. Due to the speed of the aircraft, it is usual to have the terminal of the vent forwardly directed, to take advantage of the air speed to maintain the air space above the fuel in the tanks, at a slightly positive pressure with respect to the atmosphere. This condition reduces the vaporization of the fuel, particularly at high altitudes. The great disadvantage, which is overcome by this invention, is that in the usual forwardly directed vent, there is no control over the amount of pressure in the tank and such vents very readily become clogged by ice formations.

It has long been the practice in aircraft to utilize the wing space for fuel storage by inserting flexible bags or cells in the cavities in the wings, which contain the liquid fuel, the walls of the cavity acting as retaining structure. These cells are so formed that the external dimension of the cell are substantially equal to the internal dimensions of the cavity so that when the cells are loosely placed in the cavity, the pressure load of the liquid is transmitted to the retaining structure. The cell acts only as a container for the liquid. A more detailed description of this fuel storage system can be obtained from the Gray and Zivi Patent No. 2,102,590.

In the flexible cell installation, it is usual to attach the cell at a few points around the top of the cell to the walls of the retaining structure to prevent complete collapse of the cell when empty. It is necessary, in installation of this type, to provide a vent or afford a means of open communication with the atmosphere because, as the gasoline is withdrawn from the cell, two undesirable things may take place. If not vented properly, the cell may collapse due to atmospheric pressure and place an undesirable strain on the fittings and attaching means of the cell to the cavity walls, or the pressure in the space above the gasoline may be lowered to a point where undesirable vaporizing of the gasoline may take place.

The above problems are solved by extending a pipe line from somewhere outside the airplane to a point adjacent the top of the cell to act as a vent. From pressure considerations of the airfoil in which the cell is usually mounted, it is more expedient to extend the vent tube out the under side of the wing, in the direction of the motion of the airplane to maintain a positive pressure in the cell. With this arrangement, it is obvious that the pressure in the fuel tank may build up to an undesirable maximum pressure depending on the maximum speed of the plane. It is also apparent that such a vent under certain weather conditions would easily become clogged with ice.

The primary object of the invention herein disclosed is to provide a vent for the fuel container of a vehicle which will maintain a predetermined positive pressure in the fuel container.

A further object of the invention is the provision of a fuel cell vent system in which a predetermined limited pressure may be maintained.

A further object of the invention is the provision of a forwardly directed vent line that will maintain itself ice-free under adverse weather conditions.

Further and other objects will become apparent from the description of the accompanying drawings which form a part of this disclosure and in which like numerals refer to like parts.

In the drawings:

Figure 1 is a sectional view of an airplane wing showing the invention.

Figure 2 is a perspective view of the vent attached to the vehicle.

Figure 3:
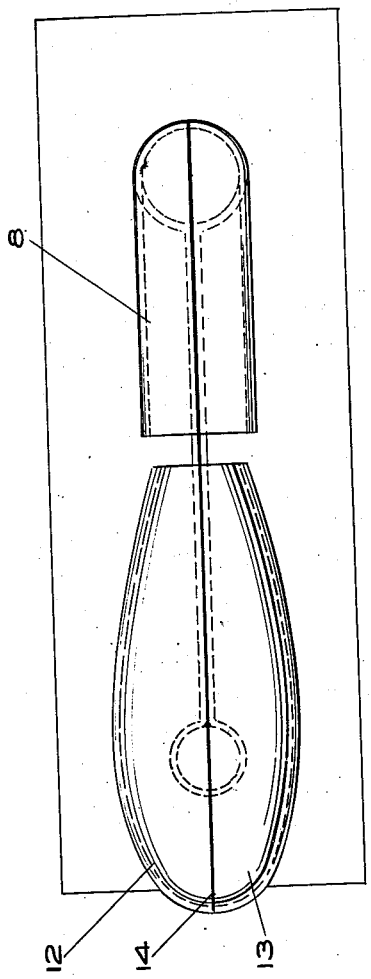
Figures 3 and 4 are plan and elevational views of the vent.

In the drawings Figure 1 shows a typical wing section and fuel storage cell installation. Fuel is stored in the flexible fuel container 1, retained in a cavity formed by the skin 2, spars 3 and 4, and transverse bulkheads 5. These cells act merely as containers for the liquid and being flexible, transmit the fluid pressure load to the retaining structure. Cells for this purpose are generally formed so that their exterior dimensions are substantially equal to the interior dimensions of the cavity adapted to receive them so that no stress is placed on the cell wall structure. It is customary to support the tops of the cells at a few points around the perimeter to prevent complete collapse when the cells are empty.

Figure 4:
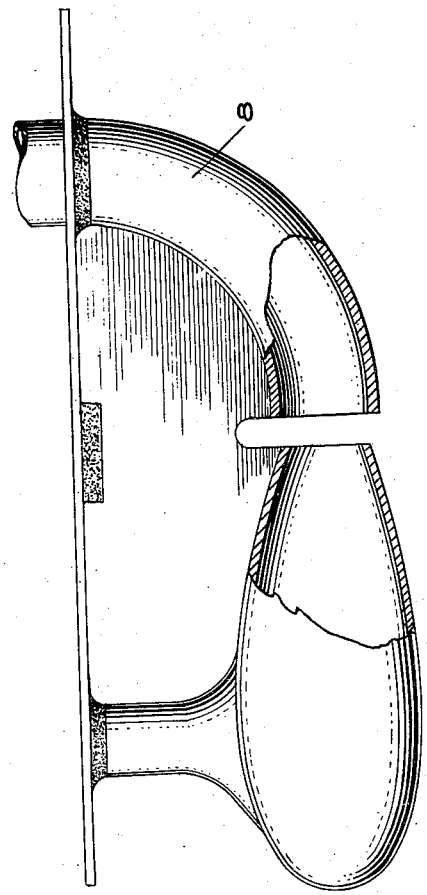

A vent line 6 extends from a fitting 7 adjacent the top of the cell installation to the vent structure shown in Figures 2, 3, and 4. This vent structure comprises a curved tube 8 having the open end thereof extending in the direction of flight. The streamlined surface of revolution 9 is positioned in front of and coaxially with the open end of tube 8. The rear portion 10 of the streamlined body is truncated to a diameter substantially equal to the interior diameter of tube 8. Both tube 8 and streamlined body 9 are supported from a mounting plate 11. This structure is more easily fabricated by means of two similar stampings shown as 12 and 13 in which both the streamlined shell, the tube, and a supporting structure are formed as a single stamping and later welded together along the parting line 14. The assembly is subsequently welded to the mounting plate 11. The space between tube 8 and body 9 is milled out to a predetermined width depending upon the pressure desired in the vent line and cell.

It is obvious that without body 9, the forwardly directed attitude of tube 8 would receive air of a pressure head equal to the velocity of the vehicle and this abnormal air pressure would be transmitted to the interior of the fuel storage cell. A slight positive pressure above the gasoline in the cell is necessary and desirable. It is necessary, to permit the flow of gasoline from the storage cell, as it is required by the engine. It is desirable, to prevent the collapse of the cell when empty or near empty. Too great a pressure is as objectionable as too little pressure in the cell. Therefore, due to the practical certainty that the open end of tube 8 will become clogged with ice, and the fact that the pressure of the air is directly depending upon the velocity of the vehicle, the open-ended forwardly direct tube is obviously unsatisfactory.

By placing the streamlined body 9 in the position shown with respect to the tube 8, certain desired results are obtained. It will be seen that due to its streamlined shape, the air will flow over the body toward the opening in tube 8. The tapered trailing edge of body 9 can be truncated so that portion 10 with respect to the open end of tube 8 is of such diameter that any desired flow of air into tube 8 may be maintained. In other words, the open end of the tube may be arranged with respect to the truncated end of the streamlined body so that it skims off a layer of air under a certain velocity head to any desired thickness, thereby controlling the volume of air. The maximum speed of the plane being known, the spacing and relative diameter can be such that the maximum desired pressure in the cell will be maintained. It will be noted that the streamlined body acts as a deflector for ice particles or moisture that might cause the icing-up of the entrance to the tube. Ice particles will be deflected by direct impact and liquid particles, entrained in the air, will be removed from the air stream before reaching the open end of the tube by centrifugal force as the air stream flows around the curved surface of the streamlined body.

This vent structure may be located on the under side of the wing for wing tanks or any where on the fuselage or body of any vehicle for other tanks.

It is to be understood that certain changes, alterations, modifications and substitutions can be made without departing from the spirit and scope of the appended claims.

I claim as my invention:

1. In combination in an aircraft, a flexible non-self-supporting fuel containing cell mounted in said aircraft, a vent mounted on the external surface of said aircraft, a vent line extending from said vent to said cell, said vent comprising a forwardly directed open-ended tube, a streamlined body having a surface of revolution positioned in front of and coaxial with said tube, the trailing end of said streamlined body truncated to a diameter substantially equal to the diameter of said tube, said truncated end of said body being spaced from the open end of said tube, said spacing being such as to regulate the amount of air flowing over the body that will enter the open end of said tube.

2. In combination in an aircraft, a flexible non-self-supporting fuel containing cell mounted in said aircraft, an anti-icing vent mounted on the external surface of said aircraft, a vent line extending from said vent to said cell, said vent comprising a forwardly directed open-ended tube, a streamlined body having a surface of revolution positioned in front of and coaxial with said tube, the forward end of said body curving to a maximum diameter greater than the diameter of said forwardly directed tube, the trailing end of said streamlined body truncated to a diameter substantially equal to the diameter of said tube, said truncated end of said body being spaced from the open end of said tube, said spacing being such as to regulate the amount of air flowing over the body that will enter the open end of said tube.

WILLIAM B. O'NEAL.